(12) United States Patent
Hsu et al.

(10) Patent No.: US 6,670,435 B2
(45) Date of Patent: Dec. 30, 2003

(54) PROCESS FOR SYNTHESIZING TRANS-1,4-POLYBUTADIENE

(75) Inventors: Wen-Liang Hsu, Cuyahoga Falls, OH (US); Adel Farhan Halasa, Bath, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/308,253

(22) Filed: Dec. 2, 2002

(65) Prior Publication Data

US 2003/0078351 A1 Apr. 24, 2003

Related U.S. Application Data

(62) Division of application No. 09/730,257, filed on Dec. 5, 2000, now Pat. No. 6,489,415.
(60) Provisional application No. 60/174,151, filed on Dec. 31, 1999.

(51) Int. Cl.$^7$ .............. C08F 4/46; C08F 4/52; C08F 36/04
(52) U.S. Cl. .......... 526/175; 526/177; 526/181; 526/335
(58) Field of Search ................ 526/175, 177, 526/187, 335

(56) References Cited

U.S. PATENT DOCUMENTS 5,086,136 A * 2/1992 Takashima et al.
5,100,965 A * 3/1992 Hsu et al.

* cited by examiner

Primary Examiner—Caixia Lu
(74) Attorney, Agent, or Firm—Alvin T. Rockhill

(57) ABSTRACT

The process and catalyst system of this invention can be utilized to synthesize polybutadiene rubber having a high trans content and a low melting point by solution polymerization. The trans-polybutadiene rubber made by the process of this invention can be utilized in tire tread rubbers that exhibit outstanding wear characteristics. More importantly, the trans-polybutadiene rubber of this invention can be easily processed because of its low level of crystallinity. In fact, the trans-polybutadiene made by the process of this invention does not need to be heated in a "hot-house" before being used in making rubber compounds. This invention more specifically reveals a process for synthesizing trans-polybutadiene rubber which comprises polymerizing 1,3-butadiene in an organic solvent in the presence of a catalyst system which comprises (a) an organolithium compound, (b) a barium compound selected from the group consisting of (i) barium salts of cyclic alcohols, such as barium mentholate, and (ii) barium thymol, and (c) an organoaluminum compound. The trans-polybutadiene made with the catalyst system of this invention typically has a glass transition temperature that is within the range of about −97° C. to about −90° C., a melting point that is within the range of about −30° C. to about 30° C., and a number average molecular weight that is within the range of about 50,000 to about 200,000.

20 Claims, No Drawings

PROCESS FOR SYNTHESIZING TRANS-1,4-POLYBUTADIENE

This is a divisional of U.S. patent application Ser. No. 09/730,257, filed on Dec. 5, 2000, now U.S. Pat. No. 6,489,415 B2, which claims the benefit of U.S. Provisional Patent Application Ser. No. 60/174,151, filed on Dec. 31, 1999.

BACKGROUND OF THE INVENTION

By virtue of its high level of crystallinity, trans-1,4-polybutadiene (TPBD) is typically a thermoplastic resin. Because it contains many double bonds in its polymeric backbone, TPBD can be blended and cocured with rubber. TPBD is similar to syndiotactic-1,2-polybutadiene in this respect. Even though trans-1,4-polybutadiene having a high melting point is a thermoplastic resin, it becomes elastomeric when cured alone or when cocured with one or more rubbers.

Good molecular weight control can normally be achieved by utilizing an anionic polymerization system to produce TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, such catalyst systems have not proven to be commercially successful.

TPBD is normally prepared utilizing transition metal catalysts or rare earth catalysts. The synthesis of TPBD with transition metal catalysts is described by J. Boor Jr., "Ziegler-Natta Catalysts and Polymerizations," Academic Press, New York, 1979, Chapters 5–6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Japanese Patent Application No. 67187-1967 discloses a catalyst system and technique for synthesizing TPBD consisting of 75 to 80 percent trans-1,4-structure and 20 to 25 percent 1,2-structure. The catalyst system described by this reference consists of a cobalt compound having a cobalt organic acid salt or organic ligand, an organoaluminum compound and phenol or naphthol. Gel formation is a serious problem that is frequently encountered when this three-component catalyst system is utilized in the synthesis of TPBD. Gelation is a particularly serious problem in continuous polymerizations. By utilizing this catalyst system and technique, TPBD can be synthesized in a continuous process with only minimal amounts of gel formation.

U.S. Pat. No. 5,089,574 is based upon the finding that carbon disulfide will act as a gel inhibitor in conjunction with three component catalyst systems which contain an organocobalt compound, an organoaluminum compound and a para-alkyl substituted phenol. U.S. Pat. No. 5,089,574 also indicates that conversions can be substantially improved by utilizing para-alkyl substituted phenols which contain from about 12 to about 26 carbon atoms and which preferably contain from about 6 to about 20 carbon atoms.

U.S. Pat. No. 5,089,574 more specifically reveals a process for synthesizing trans-1,4-polybutadiene in a continuous process which comprises continuously charging 1,3-butadiene monomer, an organocobalt compound, an organoaluminum compound, a para-substituted phenol, carbon disulfide and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

U.S. Pat. No. 5,448,002 discloses that dialkyl sulfoxides, diaryl sulfoxides and dialkaryl sulfoxides act as molecular weight regulators when utilized in conjunction with cobalt-based catalyst systems in the polymerization of 1,3-butadiene monomer into TPBD. U.S. Pat. No. 5,448,002 reports that the molecular weight of the TPBD produced decreases with increasing levels of the dialkyl sulfoxide, diaryl sulfoxide or dialkaryl sulfoxide present as a molecular weight regulator.

U.S. Pat. No. 5,448,002 specifically discloses a process for the synthesis of trans-1,4-polybutadiene which comprises polymerizing 1,3-butadiene monomer under solution polymerization conditions in the presence of at least one sulfoxide compound selected from the group consisting of dialkyl sulfoxides, diaryl sulfoxides and dialkaryl sulfoxides as a molecular weight regulator and in the presence of a catalyst system which includes an organocobalt compound, an organoaluminum compound and a para-alkyl substituted phenol.

The presence of residual cobalt in TPBD made with cobalt-based catalyst systems is not desirable. This is because the residual cobalt acts as a prooxidant leading to polymer instability during storage. This is a particular problem in cases where the TPBD is stored in a "hothouse" prior to usage, which is a standard procedure in many industries, such as the tire industry. In any case, high levels of residual cobalt in the TPBD lead to problems with polymer stability.

Unfortunately, carbon disulfide is typically required as a gel-reducing agent in the synthesis of TPBD with cobalt-based catalyst systems. This is particularly true in the case of continuous polymerization systems. However, the presence of carbon disulfide in such systems reduces the level of catalyst activity and generally makes it necessary to increase the level of cobalt in the catalyst system. Thus, in cases where carbon disulfide is required for gel control, the level of cobalt needed is further increased. This accordingly leads to greater polymer instability.

Due to its high melting point, it is normally necessary to heat TPBD in order for it to be processed using conventional mixing equipment, such as a Banbury mixer or a mill mixer. This heating step is typically carried out by storing the trans-1,4-polybutadiene in a "hothouse" for a few days prior to its usage. During this storage period, the bails of the polymer are slowly heated to a temperature above about 104° F. (40° C.). At such temperatures, the polymer can be readily processed in standard mixing equipment. However, the TPBD typically undergoes undesirable oxidative crosslinking which leads to gelation during this long heating period. This oxidation can crosslink the TPBD to such a high degree that it cannot be processed utilizing standard mixing techniques. In other words, the oxidative gelation that occurs can destroy the polymer.

U.S. Pat. No. 5,854,351 discloses that TPBD which contains a processing oil can be rapidly heated by radio frequency electromagnetic radiation. The radio frequency waves used in such a heating process typically have a frequency that is within the range of about 2 to 80 MHz (megahertz). By utilizing such a technique, an 80-pound (30 kg) bail of TPBD can be rapidly heated to a temperature above 104° F. (40° C.) in a matter of minutes. During this rapid heating process, oxidative gelation does not occur to a significant degree. This is, of course, in contrast to conventional heating techniques where bails of TPBD are slowly warmed by convection heating to the required temperature over a period of days. During this long heating period, the TPBD undergoes highly undesirable oxidative crosslinking.

U.S. Pat. No. 5,854,351 more specifically discloses a technique for mixing trans-1,4-polybutadiene with at least one rubbery polymer which comprises: (1) heating the trans-1,4-polybutadiene to a temperature which is within the range of 105° F. (41° C.) to 200° F.(93° C.) by exposing it to electromagnetic radiation having a frequency in the range of about 2 MHz to about 80 MHz, wherein the trans-1,4-polybutadiene is oil-extended with at least 10 phr of a processing oil; and (2) mixing the trans-1, 4-polybutadiene with said rubbery polymer before any portion of the trans-1,4-polybutadiene cools to a temperature below 104° F. (41° C.).

U.S. Pat. No. 5,100,965 discloses a process for synthesizing a high trans polymer which comprises adding (a) at least one organolithium initiator, (b) an organoaluminum compound, (c) a barium alkoxide and (d) a lithium alkoxide to a polymerization medium which is comprised of an organic solvent and at least one conjugated diene monomer.

U.S. Pat. No. 5,100,965 further discloses that high trans polymers can be utilized to improve the characteristics of tire tread rubber compounds. By utilizing high trans polymers in tire tread rubber compounds, tires having improved wear characteristics, tear resistance and low temperature performance can be made.

In commercial applications where recycle is required, the use of barium alkoxides can lead to certain problems. For instance, barium t-amylate can react with water to form t-amyl alcohol during steam-stripping in the polymer finishing step. Since t-amyl alcohol forms an azeotrope with hexane, it co-distills with hexane and thus contaminates the feed stream.

SUMMARY OF THE INVENTION

This invention is based upon the discovery that the problem of recycle stream contamination can be solved by synthesizing trans-1,4-polybutadiene utilizing a catalyst system which is comprised of (a) an organolithium compound, (b) a barium compound selected from the group consisting of (i) barium salts of cyclic alcohols, such as barium mentholate, and (ii) barium thymol, and (c) an organoaluminum compound. The problem of recycle stream contamination is solved by utilizing a barium salt of a cyclic alcohol as the barium compound in the catalyst system. Barium mentholate is highly preferred because it does not co-distill with hexane or form compounds during steam-stripping which co-distill with hexane. Since the boiling points of the cyclic alcohols generated upon the hydrolysis of their metal salts are very high, they do not co-distill with hexane and contaminate recycle streams. Additionally, such cyclic alcohols are considered to be environmentally safe. In fact, menthol (the hydrolyzed product of barium mentholate) is commonly used as a food additive.

The trans-1,4-polybutadiene made with such barium containing catalyst systems has a melting point that is within the range of about −30° C. to +30° C. Because the trans-1,4-polybutadiene synthesized with the catalyst system of this invention has a high melting point it does not need to be heated in a "hot-house" before it is blended with other rubbery polymers or utilized in making rubber products, such as tires. Additionally, the trans-1,4-polybutadiene is strain crystallizable and can be employed in manufacturing tire tread compounds that exhibit wear characteristics. The trans-1,4-polybutadiene also typically has a glass transition temperature which is within the range of about −97° C. to about −90° C., a number average molecular weight which is within the range of about 50,000 to about 200,000, and a Mooney ML 1+4 viscosity which is within the range of about 20 to about 110.

The present invention more specifically discloses a process for synthesizing trans-1,4-polybutadiene which comprises polymerizing 1,3-butadiene monomer in the presence of a catalyst system which is comprised of (a) an organolithium compound, (b) a barium compound selected from the group consisting of (i) a barium salt of a cyclic alcohol, and (ii) barium thymolate, and (c) an organoaluminum compound.

The present invention further discloses a process for synthesizing trans-1,4-polybutadiene which comprises polymerizing 1,3-butadiene monomer in the presence of a catalyst system which is comprised of (a) an organolithium compound, (b) a barium compound selected from the group consisting of (i) a barium salt of a cyclic alcohol, and (ii) barium thymolate, (c) an organoaluminum compound, and (d) a lithium salt of a cyclic alcohol.

DETAILED DESCRIPTION OF THE INVENTION

The polymerizations of the present invention will normally be carried out in a hydrocarbon solvent that can be one or more aromatic, paraffinic, or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerizations of this invention, there will normally be from 5 to 30 weight percent monomer (1,3-butadiene) in the polymerization medium. Such polymerization media are, of course, comprised of the organic solvent and the monomer. In most cases, it will be preferred for the polymerization medium to contain from 10 to 25 weight percent monomer. It is generally more preferred for the polymerization medium to contain 15 to 20 weight percent monomer.

The trans-1,4-polybutadiene made utilizing the catalyst system and technique of this invention are comprised of repeat units that are derived from 1,3-butadiene. The trans-1,4-polybutadiene typically has a trans-microstructure content of about 60% to about 80%. The trans-1,4-polybutadiene made in accordance with this invention exhibits a low polydispersity. The ratio of the weight average molecular weight to the number average molecular weight of such trans-1,4-polybutadiene will typically be less than 1.5. It is more typical for the ratio of the weight average molecular weight to the number average molecular weight of the trans-1,4-polybutadiene to be less than about 1.3. It is normally preferred for the high trans-1,4-polybutadiene of this invention to have a ratio of weight average molecular weight to number average molecular weight which is less than about 1.2.

The trans-1,4-polybutadiene made in accordance with this invention will typically have a melting point which is within the range of about −20° C. to about 40° C. They also typically have a glass transition temperature that is within the range of about −97° C. to about −90° C.

The polymerizations of this invention are initiated by adding an organolithium initiator, an organoaluminum compound, and a barium salt of a cyclic alcohol to a polymerization medium containing the 1,3-butadiene monomer. Preferably, the polymerizations of this invention are initiated by adding an organolithium initiator, an organoaluminum compound, a barium salt of a cyclic alcohol, and a lithium salt of a cyclic alcohol. Such polymerization can be carried out utilizing batch, semi-continuous or continuous techniques.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the molecular weight that is desired for the trans-1,4-polybutadiene being synthesized. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl) divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organomonolithium compound with 1,3-butadiene, at a ratio of about 2 to 4 moles of the organomonolithium compound per mole of the 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by R $(Li)_x$ wherein R represents a hydrocarbyl radical containing from 1 to 20 carbon atoms, and wherein x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organoaluminum compounds that can be utilized typically have the structural formula:

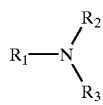

in which $R_1$ is selected from the group consisting of alkyl groups (including cycloalkyl), aryl groups, alkaryl groups, arylalkyl groups, alkoxy groups, and hydrogen; $R_2$ and $R_3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA-H).

The barium salts of cyclic alcohols that can be used can be mono-cyclic, bi-cyclic or tri-cyclic and can be aliphatic or aromatic. They can be substituted with 1 to 5 hydrocarbon moieties and can also optionally contain hetero-atoms. For instance, the barium salt of the cyclic alcohol can be a metal salt of a di-alkylated cyclohexanol, such as 2-isopropyl-5-methylcyclohexanol or 2-t-butyl-5-methylcyclohexanol. These barium salts are preferred because they are soluble in hexane. Barium salts of disubstituted cyclohexanol are highly preferred because they are soluble in hexane. Barium mentholate is the most highly preferred barium salt of a cyclic alcohol that can be employed in the practice of this invention. Barium salts of thymol can also be utilized. The barium salt of the cyclic alcohol can be prepared by reacting the cyclic alcohol directly with the barium or another barium source, such as barium hydride, in an aliphatic or aromatic solvent.

The lithium salts of cyclic alcohols that can be used can be used can be mono-cyclic, bi-cyclic or tri-cyclic and can be aliphatic or aromatic. They can be substituted with 1 to 5 hydrocarbon moieties and can also optionally contain hetero-atoms. For instance, the lithium salt of the cyclic alcohol can be a lithium salt of a di-alkylated cyclohexanol, such as 2-isopropyl-5-methylcyclohexanol or 2-t-butyl-5-methylcyclohexanol. These lithium salts are preferred because they are soluble in hexane. Lithium salts of disubstituted cyclohexanol are highly preferred because they are soluble in hexane. Lithium mentholate is the most highly preferred lithium salt of a cyclic alcohol that can be employed in the practice of this invention. Lithium salts of thymol can also be utilized. The lithium salt of the cyclic alcohol can be prepared by reacting the cyclic alcohol directly with the lithium or another lithium source, such as lithium hydride, in an aliphatic or aromatic solvent.

The molar ratio of the organoaluminum compound to the organolithium compound will be within the range of about 0.3:1 to about 8:1. It will preferably be within the range of about 0.5:1 to about 5:1 and will most preferably be within the range of about 1.2:1 to about 2:1. The molar ratio of the barium salt of the cyclic alcohol to the organolithium compound will be within the range of about 0.1:1 to salt of the cyclic alcohol to the organolithium compound will preferably be within the range of about 0.15:1 to about 1.2:1 and will most preferably be within the range of about 0.2:1 to about 0.6:1. The molar ratio of the lithium salt of the cyclic alcohol to the organolithium compound will be within the range of about 0.15:1 to about 4:1. The molar ratio of the lithium salt of the cyclic alcohol to the organolithium compound will preferably be within the range of about 0.25:1 to about 2.5:1 with ratios within the range of about 0.6:1 to about 1:1 being most preferred.

The polymerization temperature utilized can vary over a broad temperature range of from about 20° C. to about 120° C. In most cases, a temperature within the range of about 40° C. to about 100° C. will be utilized. It is typically most preferred for the polymerization temperature to be within the range of about 60° C. to about 90° C. Lower polymerization temperatures generally result in higher polymer melting points. However, the glass transition temperature of the trans-1,4-polybutadiene does not change as a function of polymerization temperature. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent. For instance, coupling agents can be used in order to improve the cold flow characteristics of the trans-1,4-polybutadiene rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

After the copolymerization has been completed, the trans-1.4-polybutadiene can be recovered from the organic solvent. The trans-1,4-polybutadiene can be recovered from the organic solvent and residue by means such as decantation, filtration, centrification and the like. It is often desirable to precipitate the trans-1,4-polybutadiene from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the trans-1,4-polybutadiene from the polymer cement also "kills" the living polymer by inactivating lithium end groups. After the trans-1,4-polybutadiene is recovered from the solution, steam stripping can be employed to reduce the level of volatile organic compounds in the segmented polymer.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, 2000 g of a silica/amumina/molcular sieve dried premix containing 18.3 weight percent 1,3-butadiene was charged into a one-gallon (3.8 liters) reactor. Then, 6.6 milliliters (ml) of a 0.2 M solution of barium thymolate (BAT) in ethylbenzene, 3.4 ml of a 1.0 M solution of menthol in hexanes, 6.6 ml of a 1.02 M solution of n-butyllithium (n-BuLi) in hexanes and 6.2 ml of a 0.87 M solution of triethylaluminum (TEA) were added to the reactor. The molar ratio of BAT to menthol to n-BuLi to TEA was 1:2.5:5:4.

The polymerization was carried out at 90° C. for 3 hours. The GC analysis of the residual monomer contained in the polymerization mixture indicated that 93% monomer was consumed after the 3 hour polymerization time. The polymerization was continued for an additional 30 minutes and then, two ml of a 1 M ethanol solution in hexanes was added to shortstop the polymerization and polymer was removed from the reactor and stabilized with 1 phm of antioxidant. After evaporating hexanes, the resulting polymer was dried in a vaccum oven at 50° C.

The polybutdiene produced was determined to have a glass transition temperature (Tg) at −93° C. and a melting temperature (Tm) at 8.1° C. It was then determined to have a microstructure which contained 4 percent 1,2-polybutadiene units, 20 percent cis-1,4-polybutadiene units, and 76% trans-1,4-polybutadiene units. The Mooney viscosity (ML-4) at 100° C. for this polymer was determined to be 34.

EXAMPLE 2

The procedure described in Example 1 was utilized in this example except that the ratio of BAT to menthol to n-BuLi to TEA ratio was changed to 1:4:10:8. About 90% on monomer was consusmed in 90 minutes. The resulting polymer had a glass transition temperature of −95° C. and a melting point of 9.5° C. It was also determined to have a microstructure which contained 5% 1,2-polybutadiene units, 20% cis-1,4-polybutadiene units, and 75% trans-1,4-polybutadiene units.

EXAMPLE 3

The procedure described in Example 1 was utilized in this example except that the polymerization was carried out at 65° C. The resulting polymer had a glass transition temperature −95° and a melting point of 9.3° C. It was also determined to have a microstructure which contained 4% 1,2-polybutadiene units, 16% cis-1,4-polybutadiene units and 80% trans-1,4-polybutadiene units.

EXAMPLE 4

The procedure described in Example 1 was utilized in this example except that lithium t-butoxide was used in place of menthol. The resulting polymer had a glass transition temperature of −95° C. and a melting point of −7.6° C. It was also determined to have a microstructure which contained 6% 1,2-polybutadiene units, 24% cis-1,4-polybutadiene units, and 70% trans-1,4-polybutadiene units.

EXAMPLE 5

The procedure described in Example 1 was utilized in this example except that barium 2-ethylhexoxide was used in place of BAT. The resulting polymer had a glass transition temperature of −95° C. and a melting point of −24° C. It was also determined to have a microstructure which contained 7% 1,2-polybutadiene units, 29% cis-1,4-polybutadiene units, and 64% trans-1,4-polybutadiene units.

EXAMPLE 6

The produce described in Example 1 was utilized in this example except that barium tetrahydrofurfurlate was used in place of BAT. The resulting polymer had a glass transition temperature of −95° C. and a melting point of −10° C. It was also determined to have a microstructure which contained 6% 1,2-polybutadiene units, 24% cis-1,4-polybutadiene units, and 70% trans-1,4-polybutadiene units.

EXAMPLE 7

The procedure described in Example 1 was utilized in this example except that the polymerization was conducted at 65° C. and that menthol was not used as part of catalyst component. The resulting polymer had a glass transition temperature of −91° C. and a melting point of 11° C. It was also determined to have a microstructure which contained 5% 1,2-polybutadiene units, 19% cis-1,4-polybutadiene units, and 76% trans-1,4-polybutadiene units.

EXAMPLE 8

The procedure described in Example 1 was utilized in this example except that menthol was not used as part of catalyst component. The resulting polymer had a glass transition temperature of −95° C. and a melting point of −14° C. It was also determined to have a microstructure which contained 6% 1,2-polybutadiene units, 22% cis-1,4-polybutadiene units, and 72% trans-1,4-polybutadiene units.

EXAMPLE 9

The procedure described in Example 1 was utilized in this example except that menthol was not used as part of catalyst component with barium mentholate (BAM) was used in place of barium thymolate (BAT). The resulting polymer had a glass transition temperature of −95° C. and a melting point of −13° C. It was also determined to have a microstructure which contained 6% 1,2-polybutadiene units, 25% cis-1,4-polybutadiene units, and 69% trans-1,4-polybutadiene units.

EXAMPLE 10

The procedure described in Example 9 was utilized in this example except that polymerization was carried out at 75° C. The resulting polymer had a glass transition temperature of −94° C. and a melting point of 7.1° C. It was also determined to have a microstructure which contained 5% 1,2-polybutadiene units, 19% cis-1,4-polybutadiene units, and 76% trans-1,4-polybutadiene units. The Mooney viscosity of this polymer at 100° C. was determined to be 78.

EXAMPLE 11

The procedure described in Example 1 was utilized in this example except that dibutylmagnesium (Bu2Mg) was used instead of n-BuLi and barium mentholate (BAM) was used in place of barium thymolate (BAT). The ratio of BAM to $Bu_2Mg$ to t-BuOLi to TEA was 1:10:4:4. About 70% monomer conversion was achieved after 6 hours of polymerization time at 90° C. The resulting polymer has a glass transition temperature of −95° C. and a melting point of 8.1° C.

EXAMPLE 12

The procedure described in Example 7 was utilized in this example except that 1.5 times as much of the BAT was used with the ratio of BAT to n-BuLi to TEA ratio being 1:10:9. The resulting polymer has a glass transition temperature of −91° C. and a melting point of 44° C. It was also determined to have a microstructure which contained 3% 1,2-polybutadiene units, 13% cis-1,4-polybutadiene units, and 84% trans-1,4-polybutadiene units.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for synthesizing trans-1,4-polybutadiene which comprises polymerizing 1,3-butadiene monomer in the presence of a catalyst system which is comprised of (a) an organolithium compound, (b) a barium compound selected from the group consisting of (i) a barium salt of a di-alkylated cyclohexanol, and (ii) barium thymolate, (c) an organoaluminum compound, and (d) a lithium salt of a cyclic alcohol.

2. A process as specified in claim 1 wherein the polymerization temperature is within the range of about 20° C. to about 120° C.

3. A process as specified in claim 1 wherein the polymerization temperature is within the range of about 40° C. to about 100° C.

4. A process as specified in claim 1 wherein the polymerization temperature is within the range of about 60° C. to about 90° C.

5. A process as specified in claim 2 wherein the molar ratio of the organoaluminum compound to the organolithium compound is within the range of about 0.3:1 to about 8:1.

6. A process as specified in claim 5 wherein the molar ratio of the barium compound to the organolithium compound is within the range of about 0.1:1 to about 1.8:1.

7. A process as specified in claim 6 wherein the molar ratio of the lithium salt of the cyclic alcohol to the organolithium compound is within the range of about 0.15:1 to about 4:1.

8. A process as specified in claim 3 wherein the molar ratio of the organoaluminum compound to the organolithium compound is within the range of about 0.5:1 to about 5:1.

9. A process as specified in claim 8 wherein the molar ratio of the barium compound to the organolithium compound is within the range of about 0.15:1 to about 1.2:1.

10. A process as specified in claim 9 wherein the molar ratio of the lithium salt of the cyclic alcohol to the organolithium compound is within the range of about 0.25:1 to about 2.5:1.

11. A process as specified in claim 4 wherein the molar ratio of the organoaluminum compound to the organolithium compound is within the range of about 1.2:1 to about 2:1.

12. A process as specified in claim 5 wherein the molar ratio of the barium compound to the organolithium compound is within the range of about 0.2:1 to about 0.6:1.

13. A process as specified in claim 6 wherein the molar ratio of the lithium salt of the cyclic alcohol to the organolithium compound is within the range of about 0.6:1 to about 1:1.

14. A process as specified in claim 2 wherein the organolithium compound is an alkyl lithium compound.

15. A process as specified in claim 7 wherein the organolithium compound is n-butyllithium.

16. A process as specified in claim 7 wherein the barium compound is barium thymolate.

17. A process as specified in claim 7 wherein the barium compound is barium mentholate.

18. A process as specified in claim 7 wherein the 1,3-butadiene monomer is polymerized in a hydrocarbon solvent.

19. A process as specified in claim 7 wherein the organoaluminum compound is selected from the group consisting of triethylaluminum, tri-n-propyl aluminum, and tri-isobutyl aluminum.

20. A process as specified in claim 14 wherein the alkyl aluminum compound is utilized at a level which is within the range of 0.01 phm to 0.1 phm.

* * * * *